UNITED STATES PATENT OFFICE.

SAMUEL R. PERCY, OF NEW YORK, N. Y., ASSIGNOR TO HENRY A. MOTT, OF SAME PLACE.

PRESERVING WOOD.

SPECIFICATION forming part of Letters Patent No. 249,856, dated November 22, 1881.

Application filed January 28, 1881. (No specimens.)

*To all whom it may concern:*

Be it known that I, SAMUEL R. PERCY, of New York, in the county of New York and State of New York, have invented an Improved Method of Preserving Wood, of which the following is a specification.

My invention relates to the preservation of wood for the purpose of protecting the same from all the deleterious and injurious effects incident upon submersion in water—as, for instance, insects which destroy and produce water-logged wood by boring into it, and plants, insects, or animals which grow on or within the same.

This invention consists, essentially, in the impregnation of wood with picric acid or any of the picrates, in combination with resinous gums, pitch, or coal-tar dissolved in gasoline, naphtha, turpentine, or other solvent.

The substances I employ are picric acid or any picrate, alone or in combination with resin or any of the gum-resins—as aloes, pitch, asphalt, or coal-tar—the picric acid or picrates to be suspended or dissolved in the resins or gums by the aid of gasoline, or any of the petroleum spirits, or any other solvent for resinous substances.

The wood to be treated is properly dried, and in this condition is immersed in the resinous solution containing the picric acid or picrate, and when sufficient of it is absorbed into the pores of the wood it is allowed to dry by evaporation, so that the bitter substance is left in combination or incorporated with the resin in the cells of the wood rendered insoluble, and so impregnating the wood that insects will not bore into it or deposit upon it. The resins being insoluble in water, and the picric acid or picrates being incorporated therewith, they are practically rendered insoluble, and as the cells of the wood throughout are filled with this compound the poisonous and bitter picric acid or picrates insure its protection against all injury from the animal as well as the vegetable kingdom. In impregnating the wood with these substances it may be simply dried and immersed in the solution of picric acid or picrates and resin a length of time sufficient to absorb within the cells of the same enough of the bitter resinous substance to thoroughly impregnate it; or the wood may be put into air-tight receptacles and atmospheric pressure used to force the bitter resinous substance into it; or the wood may be introduced into a vessel and a vacuum produced by exhausting the air, so as to empty the wood cells of air and moisture, after which the bitter resinous substance is admitted, and after the removal of the impregnated wood the solvent is allowed to evaporate, leaving the picric acid or picrate in an insoluble condition. This latter process would be more rapid, and therefore desirable.

In this application I do not claim anything relating to the incorporation of picric acid or picrates with any insoluble paints.

The composition set forth in British provisional protection No. 301 of 1871 is simply a grease composition for metallic surfaces, and is not a solution or a compound adapted for the preservation of wood. The acid is not rendered insoluble, and the resin is only used to give consistence.

Having now described my invention, what I claim as new, and desire to secure by Letters Patent, is—

1. The herein-described compound for the preservation of wood, which consists of a solution of a resinous gum or equivalent substance and picric acid or a picrate, substantially as and for the purpose specified.

2. As an article of manufacture, timber having its pores or cells coated or filled with an insoluble compound of a resinous gum or its equivalent and picric acid or a picrate, as and for the purpose specified.

3. The herein-described process for the preservation of wood, consisting in the impregnation of the wood with a solution consisting of picric acid or any of the picrates and resin or gum-resin or their equivalent, dissolved in a common solvent, and afterwards evaporating off the solvent, substantially as and for the purpose specified.

In testimony of which invention I hereunto set my hand.

SAM. R. PERCY.

Witnesses:
GILBERT S. VAN PELT,
AUSTIN S. CUSHMAN.